Jan. 9, 1968   J. J. DYER, SR   3,362,485
POST DRIVER
Filed Oct. 21, 1965   3 Sheets-Sheet 2

INVENTOR
JOHN J. DYER, SR.

BY *Beale and Jones*
ATTORNEYS

Jan. 9, 1968  J. J. DYER, SR  3,362,485
POST DRIVER
Filed Oct. 21, 1965  3 Sheets-Sheet 3
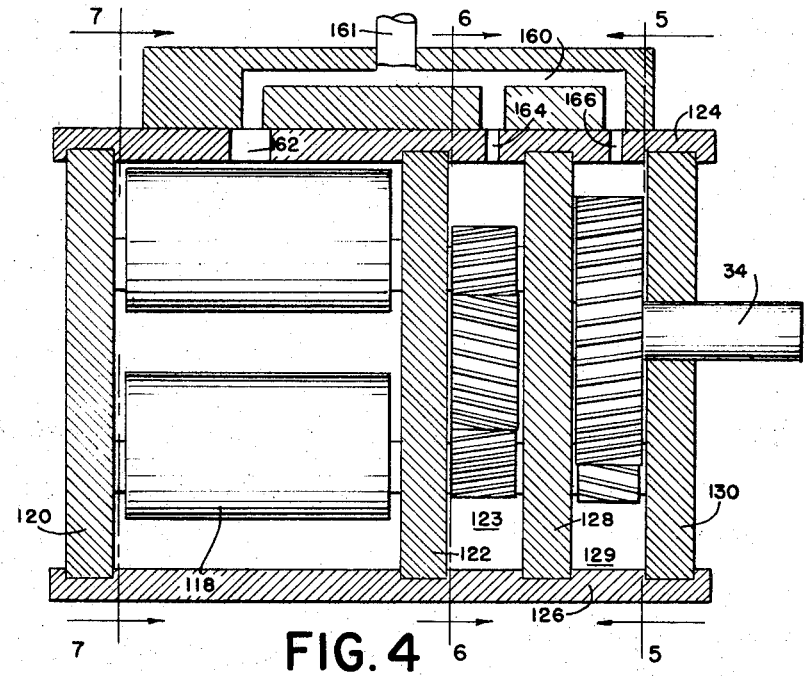
FIG. 4
FIG. 6
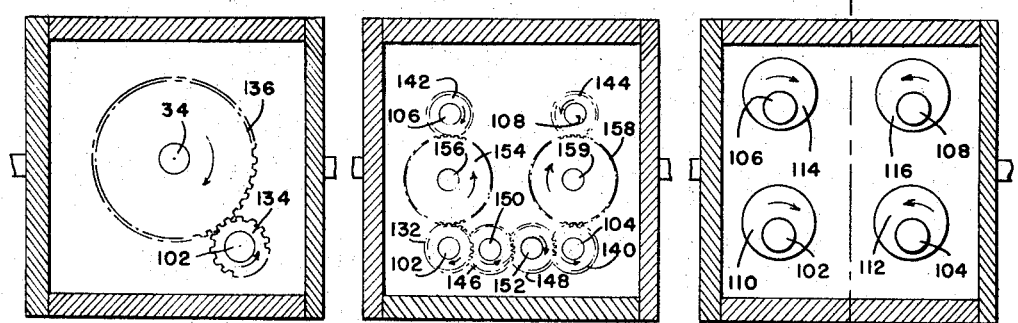
FIG. 5  FIG. 7
INVENTOR
JOHN J. DYER, SR.
BY Beale and Jones
ATTORNEYS

United States Patent Office 3,362,485
Patented Jan. 9, 1968

3,362,485
POST DRIVER
John J. Dyer, Sr., 11 Plymouth Ave.,
Whitesboro, N.Y. 13492
Filed Oct. 21, 1965, Ser. No. 499,245
10 Claims. (Cl. 173—49)

ABSTRACT OF THE DISCLOSURE

There is a vibratory post driver mounted on a vertical trackway that is supported from a tractor. The vertical trackway has pivotally attached a pair of generally parallel vertically spaced apart arms that pivotally extend from a vertically extending arm that has its bottom end pivotally attached to a rear projecting support on a tractor. A generally forward and rearwardly movable power arm extends rearwardly from the tractor and is pivotally connected at its rear end in the upper end of the vertically extending arm on the rear of the tractor to move the vibratory post driver up and down. A power-take-off leads from the tractor to drive the vibratory post drive. The vertical trackway on which the vibratory mechanism slides up and down has two spaced apart tracks which have a ground engaging base plate at their lower end. A carriage containing the vibratory mechanism has a pair of spaced apart shoes that ride on the trackway. The carriage is elevated by means of a cable leading over a sheave on a top plate at the upper end of the vertical trackway. The cable is attached to a winch on the tractor. The carriage includes a frame to which the shoes are attached. Within the frame is an enclosed housing carrying the vibratory mechanism. The frame is generally open having a top and bottom wall connected by oppositely disposed end walls. Extending vertically between the top and bottom walls are a plurality of spaced apart guide rods arranged on opposite sides of the housing. The housing has horizontal flange portions which suspend it within the frame and between vertically oppositely disposed springs. The housing has imparted to it from mechanism therewithin vertical vibratory forces which are imparted to the frame. A clamp on the frame imparts these forces to a post to be driven into the ground. The mechanism within the housing includes four parallel shafts which rotate about fixed axes. The first of the shafts is horizontally disposed from a second shaft. A third shaft and a fourth shaft are vertically disposed from the first two shafts respectively. The shafts are arranged in a symmetrical fashion with the first and third lying on opposite sides of a vertical plane through the housing while shafts two and four are on the opposite side of this vertical plane. Each of the shafts carries a weight which is a generally cylindrical prismatic body. The weight on each shaft is mounted eccentrically to its shaft. The shafts and their respective weight on the left side of the vertical plane are rotated in a clockwise direction, whereas the shafts on the right side are rotated in a counter-clockwise direction. The shafts are rotated at a same angular velocity; therefore, if all of the weights are eccentrically offset upwardly from their shafts, they will always be in phase with each other at this stage of their movement. Likewise, when one of the eccentric weights has its center of gravity disposed directly below its shaft, so too will be the weights on the other shafts. This particular arrangement produces vibrations which are solely parallel to the vertical plane. There are no lateral vibrations but only vertical vibrations. The weights are all located in one chamber and drive gearing on the shafts are located in an adjacent chamber. The chambers are connected together above an oil level so that oil is splashed from the weight chamber to the gear chamber. There is a flexible coupling connecting a power drive shaft to the gearing from a driven shaft mounted in a bearing in the frame. The power-take-off or other drive is connected to the drive of this last mentioned shaft.

---

This invention relates to a post driver of the type which drives post or other elongated members into the earth or other hard surface through the use of vertical vibrations.

The specific embodiment disclosed herein is small enough to be mounted on an ordinary tractor, and it is adapted to be used for driving posts used for supporting reflective highway markers or fence posts. However, the invention may be used on larger bodies by varying its scale and making other necessary and obvious modifications.

The use of a vibrating mechanism for driving objects into the earth is known in the prior art. This invention presents certain improvements to such devices in the following respects: (1) substantial vibratorily-induced forces are generated by a relatively small device; (2) the device is conveniently mounted on a vehicle in a manner which permits transportation from place-to-place without necessitating a substantial time for setting it up and taking it down; (3) an efficient lubrication system is provided in which eccentrically mounted weights serve the dual purpose of (a) splashing lubricant and (b) producing vibratory movements; and (4) a suitable transmission means permits the transfer of energy from a relatively stationary source to a vertically movable vibrating carrier.

One object of this invention is to provide a vibrating post driver which is mounted in a prescribed manner on a traction vehicle which enables it to be transported between working locations and enables it to be easily placed at and removed from its sites.

Another object is to provide a vibration-producing mechanism which, for its relatively small size, provides an ample vibrating force along only one axis.

Still another object is to provide a simple system for lubricating the gears that actuate the eccentric weights which induce vibrations in the device.

A further object is to provide a new and improved combination of transmission linkages which transfer rotary motion from a fixed power-take-off of a vehicle to a vertically movable vibrator.

These and other objects are satisfied by the present invention which is described in one of its embodiments in the following specification and illustrated in the accompanying drawings in which:

FIG. 4 is a sectional view of the housing of the invention and its enclosed mechanisms as seen along the line 4—4 in FIG. 3;

FIG. 5 is a view of the first stage of gearing within the housing taken along the line 5—5 in FIG. 4;

FIG. 6 is a view of the second stage of gearing within the housing taken along line 6—6 in FIG. 4;

FIG. 7 is an end view of the rotating eccentric weights and their shafts as seen along line 7—7 in FIG. 4; and FIG. 8 is a transverse sectional view of the clamp used to attach an elongate post to the vibrating carriage.

Figure 1:
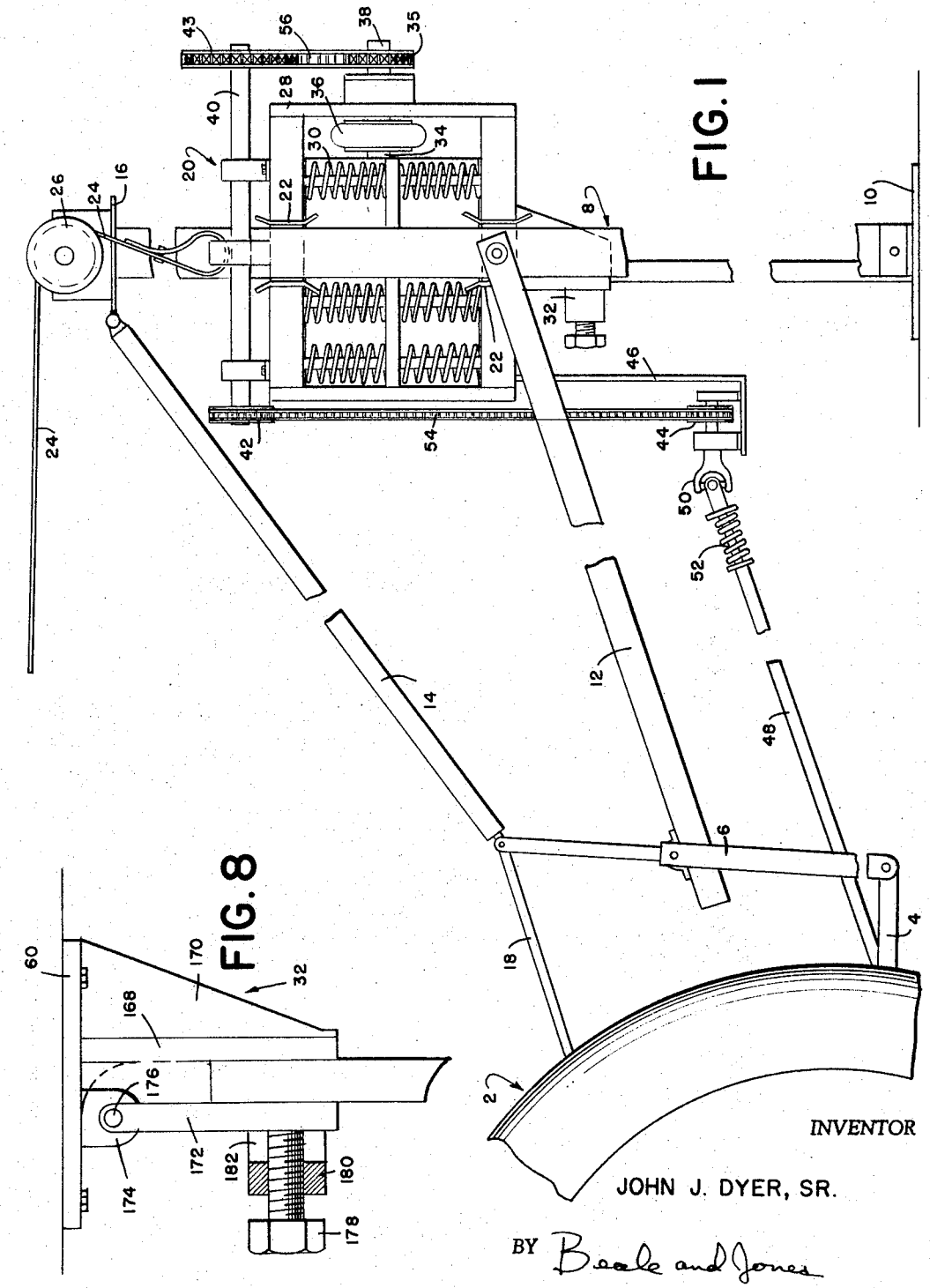
FIG. 1 is an elevational view of the post driver as mounted rearwardly of a conventional traction vehicle, with certain portions removed for purposes of illustration.

The overall construction of the apparatus of this invention and its usual environment is shown in FIG. 1. A tractor or other traction vehicle 2 is normally used for transporting the post driving apparatus from one location to another. Projecting rearwardly from the vehicle is a projection 4 which constitutes a portion of its frame. A generally vertical arm 6 is pivotally connected at its lower portion to the projection 4 of the vehicle. This arm 6 usually will have its upper portion laterally offset from its lower portion, but in a mechanical sense it operates as a single lever.

Rearwardly of the vehicle is the generally vertical trackway 8 which carries the vibrating mechanism of the invention. This trackway is provided with a base plate 10 at its lower portion to provide stability when resting on the ground. There are two parallel vertical beams which constitute the major portion of the trackway 8 and provide the surfaces along which the vibrating assembly moves. The trackway 8 is interconnected to the generally vertical arm 6 by at least a pair of generally parallel elongated bars 12 and 14 which themselves are pivotally connected at both ends to the members 6 and 8. It is desirable to have a pair of the lower bars 12 attached to opposite sides of the trackway 8 in order to add stability to the structure. The upper elongated bar 14 is connected to a top plate 16 which is located at the uppermost end of the vertical trackway 8.

When it is desired to move the post driving assembly from one location to another, an operator may simply pull a lever or actuate some other known mechanism to move forwardly an arm 18 which is attached pivotally to the upper end of the arm 6. The parallelogram structure formed by the bars 12 and 14, the arm 6 and trackway 8 will cause the trackway to move upwardly for convenient transportation from one location to another.

The carriage which contains the vibrating mechanism used for driving posts is generally designated 20. It has pairs of spaced-apart shoes 22 which ride on the vertical beams of trackway 8. It may be raised or elevated by means of a cable 24 which is attached to its upper wall. This cable rides in a sheave 26 which is mounted on the top plate 16 of the trackway. The cable is moved by means of a winch or any other mechanism on the traction vehicle.

The carriage includes the frame 28 to which the shoes 22 are attached. Within the frame is an enclosed housing 30 which contains the vibrating mechanism. This housing is resiliently mounted within the frame by a plurality of parallel rods and coil springs which are described below in more detail in the discussion of FIGS. 2 and 3. On the underside of the frame 28, there is provided a clamp means 32 which is used for engaging a post or other elongated member which is to be driven into the ground.

Energization of the vibrating mechanism is accomplished by rotating the shaft 34 which projects from the housing 30. This shaft is driven through a transmission means which includes a flexible coupling 36, such as the one shown in U.S. Patent 2,648,958, a relatively short shaft 38 which is journaled in the frame 28, and a sprocket 35 which is connected to shaft 38. A relatively long shaft 40 is mounted in the bearing blocks on the top of the frame 28. Sprockets 42 and 43 are located on the opposite ends of the shaft 40. Another sprocket 44 is journaled on a downward projection 46 which extends from the frame 28.

The source of power for the vibrating mechanism is the conventional power-take-off of the traction vehicle. A rotatable rod 48 extends rearwardly from the vehicle's power-take-off to the sprocket 44. Suitable universal connections and an axially slidable connection are located at 50 and 52, respectively. These are necessary since the inclination and overall length of rod 48 are continually varying as the carriage descends. Actuation of the power-take-off will cause rotation of the drive rod 48 which is generally parallel to the bars 12 and 14. This rotates the sprocket 44 which, through chain 54 and sprocket 42 will rotate the shaft 40. The rotation thus imparted to sprocket 43 is transmitted through the chain 56 to the sprocket 35 on the shaft 38. Acting through the flexible coupling 36, this will transmit a rotary motion to the input shaft 34 of the vibratory mechanism.

Figures 2, 3:
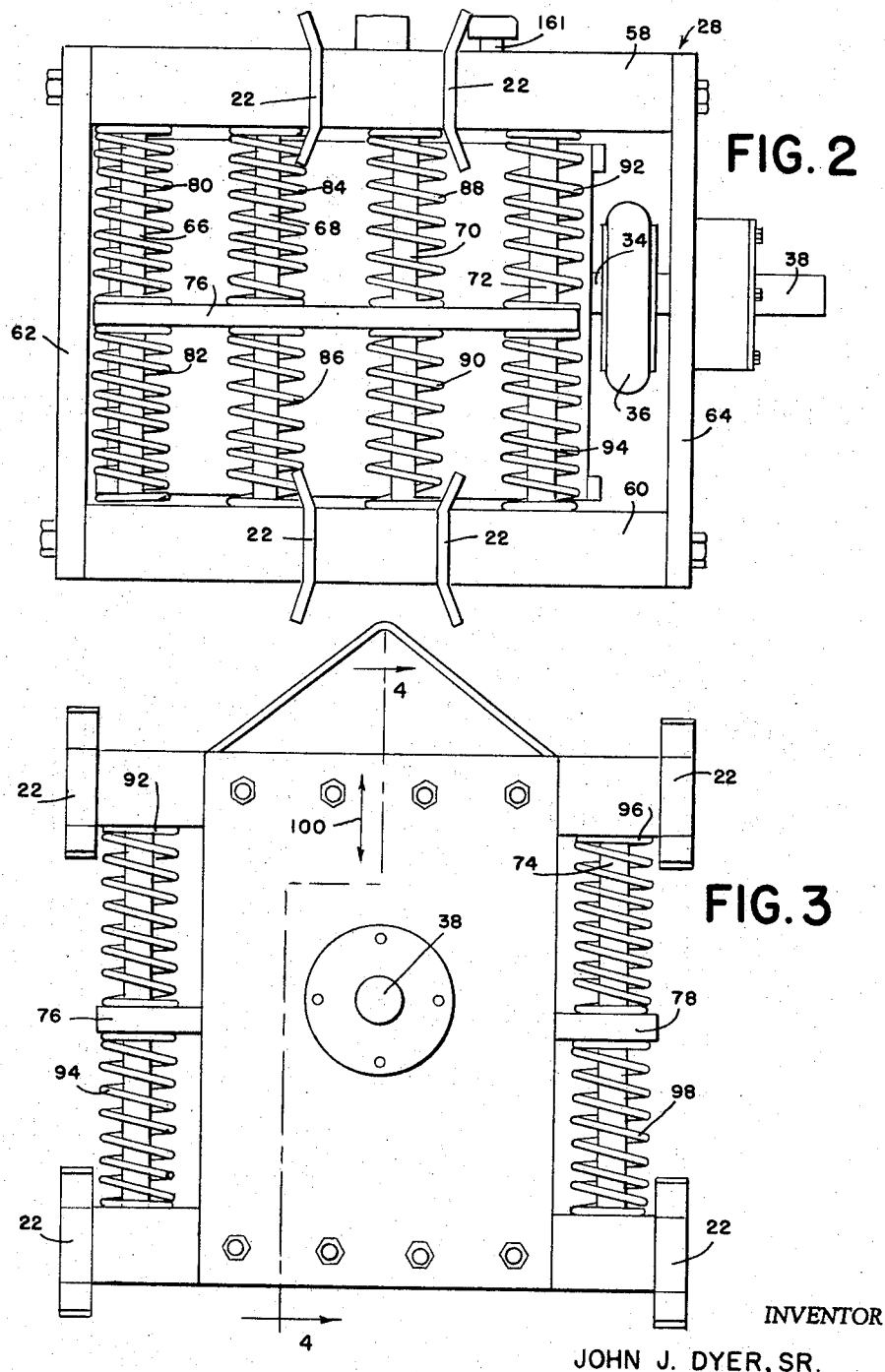
FIGS. 2 and 3 are elevational side and end views, respectively, of a major portion of the vibrating carriage of the invention.

The general relationship between the frame 28 and the vibrating housing 30 is shown in greater detail in FIGS. 2 and 3, with many elements removed for clarity of illustration. The frame 28 is a generally open member comprising a top wall 58, bottom wall 60, and side walls 62 and 64. The guide shoes 22 are located on the edges of the top and bottom walls. Extending vertically between the top wall 58 and bottom wall 60 are a plurality of guide rods which are designated 66, 68, 70, 72, and 74. These are arrayed in equal numbers on both sides of the housing. The housing 30 has generally horizontal flange portions 76 and 78 extending outwardly therefrom as shown in FIG. 3. Each of these flanges is provided with a series of apertures which slidably receive the vertical guide rods. In this manner, the housing may move vertically with respect to the frame 28.

In order to provide a resilient connection between the frame 28 and housing 30, there are a plurality of helical compression coil springs 80, 82, 84, 86, 88, 90, 92, 94, 96, and 98 which are located on the vertical guide rods. Of course, there are equal numbers of springs on both sides of the housing. These helical compression springs tend to maintain the housing in the position shown in FIGS. 2 and 3. However, when the housing 30 is vibrated vertically in the directions shown by 100, vertical forces are generated and transmitted to the frame 28. It is these forces which are imparted to the clamp 32 shown in FIG. 1 and consequently to the elongated post member which is being driven into the ground.

The mechanism which generates the vertical vibratory movement in the housing 30 is illustrated in FIGS. 4, 5, 6 and 7. Its basic principle of operation is the well-known principle that when a mass is rotated about an axis which is eccentric to its center of gravity, it will generate at the axis about which it is rotated some vibratory movement caused by the irregular acceleration of the mass.

As shown in FIG. 7, there are four parallel shafts in the housing which rotate about fixed axes. The first of the shafts 102 is horizontally disposed from a second shaft 104. A third shaft 106 and a fourth shaft 108 are vertically disposed from the shafts 102 and 104, respectively. The shafts are arrayed in a symmetrical fashion with the shafts 102 and 106 lying on an opposite side of plane A—A from the shafts 104 and 108. The plane A—A is vertically disposed and extends parallel to the axes of the shafts 102, 104, 106 and 108.

Each of the aforementioned shafts carries a weight which is generally a cylindrical prismatic body. The weight 110 on the first shaft 102 is mounted eccentrically to the shaft, i.e. its center of gravity is located at a point spaced from the center of gravity of the shaft. In a like manner, eccentric weights 112, 114 and 116 are mounted on the shafts 104, 106 and 108.

It will be noted in FIG. 7 that the shafts and their respective weights on the left side of plane A—A are rotated in a clockwise direction, whereas the shafts 104 and 108 on the right side of plane A—A are rotated in a counter-clockwise direction. The shafts are rotated at a same angular velocity; therefore, if all of the weights are eccentrically offset upwardly from their shafts as shown in FIG. 7, they will always be in phase with each other at this stage of their movement. Likewise, when one of the eccentric weights has its center of gravity disposed directly below its shaft, so too will be the weights on the other shafts. This particular arrangement produces vibrations which are solely parallel to the plane A—A. Since any horizontal outward movement of the weights on the left side of plane A—A will be counteracted by an opposite and equal movement of the weights on the right side of this vertical plane, there are no lateral vibrations. The same happens when the weights move inwardly toward plane A—A. Since there is no lateral or horizontal vibration, and since all of the weights are in phase with each other at their upper and lowermost positions, it will be understood that only vertical vibratory motion is produced.

Referring to FIG. 4, it will be seen that all of the weights, including weights 110 and 114 are located in a first chamber 118 of the housing 30. This first chamber 118 is defined by an exterior wall 120 and interior wall 122 which extends vertically between the upper wall 124 and lower wall 126 of the housing 30. A second chamber 123 in the housing is defined between the walls 122 and 128 and the top and bottom walls; while a third chamber exists between the walls 128 and 130 within the housing. Each of the walls 120, 122, 128 and 130 is provided with suitable apertures and bearing means which permit the passage of the various shafts therethrough and provide low-friction supports for the rotating shafts.

The first shaft 102 extends through all three of the chambers as described above. This shaft 102 carries an eccentric weight 110 which is located in the first chamber 118. In the second chamber 123, it carries and is keyed to a spur gear 132 which has helical teeth. A helical-toothed pinion gear 134 is carried by the shaft 102 in the third chamber 129.

This shaft 102 is rotated by means of a bull gear 136 which is keyed to the rotatably mounted input shaft 34 in the third chamber 129. This is illustrated in FIG. 5. The input shaft 34 is connected to the power source in the manner indicated in FIG. 1. Thus, as the shaft 34 and bull gear 136 are rotated, the pinion 134 also rotates. This will rotate the entirety of shaft 102 and the elements carried thereon.

The gear means which causes the remaining shafts 104, 106 and 108 to rotate with their eccentric weights is contained in the second chamber 123 and illustrated diagrammatically in FIG. 6. The shafts 104, 106 and 108 which carry the remaining three weights extend through the first chamber 118 and the second chamber 123 as described above, with their weights located in the first chamber. In the second chamber 123 there is a series of idler gear means which imparts rotation to the spur gears 140, 142, 144 and their respective shafts. As shown in FIG. 6, a pair of equal sized idler gears 146 and 148 are interposed between and meshed with the spur gears 132 and 140 on the first and second shafts. Idler gear 146 is mounted on a shaft 150 and the gear 148 is mounted on shaft 152, with both of these shafts extending only through the second chamber 123. From the illustration in FIG. 6, it will be noted that these idler gears 146 and 148 will produce movement in the spur gear 140 on the second shaft which is equal in magnitude and opposite in direction to the rotational movement of the driving spur gear 132.

Idler gear means are also used to transmit rotary motion from the first driven spur gear 132 to the third spur gear 142 which is located thereabove. Rotation in a same velocity is desired between these two gears, and a single relatively large idler gear 154 serves this purpose. This idler gear 154 is mounted on a shaft 156 which is only in the second chamber 123. In a similar manner, an idler gear 158 on shaft 159 is used to transmit the rotation of spur gear 140 on the second shaft 104 to the spur gear 144 on the fourth shaft 108.

Summarizing the operation of the driving mechanism and gear means which causes movement of the eccentric weight, it will be noted that the input is received through the shaft 34 and transmitted through bull gear 136 to the pinion gear 134 which is keyed to the shaft 102. Rotation of shaft 102 causes movement of eccentric weight 110 in the first chamber and rotation of a pinion gear 132 in the second chamber. The pinion gear 132 acts through idler gear 154 to drive the spur gear 142 and consequently its shaft 106 and weight 114. The first spur gear 132 also imparts rotation to idler gears 146 and 148, to transfer power to the spur gear 140 and shaft 104. This causes rotation of the second weight 112. The idler gear 158 acts similarly to the previously described idler 154 to impart rotation to the spur gear 144, its shaft 108 and its associated weight.

The mechanism described above is intended to operate at a high speed to produce about 8,000 vibratory cycles per minute. It therefore is imperative that the rotating gears be lubricated adequately and continuously to prevent their rapid deterioration. The described lubrication system which constitutes a portion of the invention is illustrated in FIG. 4.

Essentially, this lubrication system is a splash system in which the splasher is an eccentrically rotating weight. A body of liquid lubricant, preferably an oil, is held within the first chamber 118. The chamber is filled with lubricant to a liquid level which is above the lowermost position of the weights 110 and 112. Thus, as the weights are rotated, they will splash the lubricant upwardly. In the upper wall of the housing 30, there is a passage 160 which communicates between the first chamber 118 and the chambers 123 and 129. The passage 160 is vented at 161. It has an inlet 162 in the upper wall of the first chamber which is located to receive the lubricant that is splashed upwardly by the rotating weights. Its outlets 164 and 166 are located in the upper walls of chambers 123 and 129, respectively, directly above the gears which rotate in these chambers. By this construction, the bath of lubricant is splashed upwardly through inlet 162 into passage 160, and then is permitted to fall through outlets 164 and 166 onto the gears in the chambers 123 and 129. Of course, there are openings through the lower portions of walls 122 and 128 which permit the lubricant to return to the first chamber 118.

Details of a suitable clamp means 32 which is located on the lower wall of the frame 28 are shown in FIG. 8. It will be recalled that this clamp means is used to attach the frame 28 to the post or other elongated member which is to be driven into the ground.

The clamp means includes a stationary member 168 which is rigidly attached to the bottom wall 60 of the frame 28. A reinforcing flange 170 helps to maintain the member 168 in position. To the left of stationary member is a movable member 172 which is pivotally mounted on a projection 174 on the frame by means of a pin 176. This permits swinging movement of movable member 172 toward and away from the stationary member 168. In order to urge the movable member 172 to the right, there is provided a threaded bolt 178 which is engaged within a suitable opening in an apertured member 180. Side members 182 attach the opposite ends of apertured member to the stationary member 168 so that they form a generally U-shaped configuration when viewed in horizontal cross-section.

A post which is to be driven is placed between the members 168 and 172. Its movement to the sides may be prevented by side-enclosing plates which are not shown. The bolt 178 is turned to force movable member 172 toward stationary member 168 and thus grip the upper end of the post.

Once a post is firmly secured to clamp 32, the operator may energize the power-take-off of the traction vehicle. This causes movement of the transmission elements shown in FIG. 1, the gear means shown in FIGS. 4–6 and the eccentric weights shown in FIG. 7. The resulting high speed vibrations conjoined with the inherent weight of the carriage will cause the elongated post to be driven quickly into the earth or any other surface.

In the foregoing specification, only a single illustrative embodiment of the invention has been described. It adequately satisfies the objects of the invention which appear above. Of course, it is contemplated that many variations may be made to this device which will occur to those working in the art. However, it is specifically pointed out that the scope of protection rendered hereby is not restricted to only the described embodiment, but is delineated by the claims which follow.

I claim:

1. An eccentric weight vibrating assembly for driving elongated members comprising, a housing adapted to be filled to a liquid level with a bath of lubricant, a shaft mounted for rotation in said housing, a weight mounted eccentrically on said shaft, said weight being located in a first chamber of said housing, gear means located in a second chamber for rotating said shaft, a passage between said first chamber and said second chamber, said passage having an inlet in said first chamber above said liquid level and located to receive lubricant splashed upwardly by said weight and an outlet in said second chamber disposed above said gear means; whereby the rotation of said shaft and weight will splash a lubricant into said passage and said lubricant wall fall onto said gear means to provide lubrication thereto.

2. A vibrating assembly for driving elongated members comprising, a housing containing at least four parallel shafts, weights mounted eccentrically on said shafts, one-half of said weights lying on one side of a vertical plane parallel to said shafts, all weights on one side of said vertical plane rotating in a same direction which is opposite to the direction of rotation of all weights located on another side of said vertical plane, means rotating all of said shafts at a same speed and in phase with each other so that all of said weights will reach their uppermost and lowermost positions simultaneously, said weights being located in a first chamber of said housing, gear means located in a second chamber of said housing for driving said shafts, said first chamber being adapted to contain a body of oil up to a given liquid level which is above the lowermost position of one of said weights, a passage between said first and second chambers, said passage having an inlet in said first chamber above said liquid level and located to receive lubricant splashed upwardly by said weights and an outlet in said second chamber disposed above said gear means; whereby the rotation of said shafts and weights will splash a lubricant into said passage and said lubricant will fall onto said gear means to provide lubrication.

3. A vibrating assembly for driving elongated members comprising, a housing resiliently mounted on said frame, clamp means on said frame for engaging a said elongate member, a power source; and means in said housing for imparting a vibratory motion thereto including the following elements: a bull gear connected to said power source, a pinion gear smaller than said bull gear mounted on a first shaft and meshed with said bull gear, a second shaft parallel to and horizontally disposed from said first shaft, a pair of intermeshed gears of equal size each meshed with one of the aforementioned shafts to impart movement to said second shaft which is equal in magnitude and opposite in direction to the rotation of said first shaft, a third shaft parallel to and vertically disposed from said first shaft, a fourth shaft parallel to and vertically disposed from said second shaft, an idler gear intermeshing said first and third shafts for rotation in a same direction and at the same velocity, an idler gear intermeshing said second and fourth shafts for rotation in a same direction and at the same velocity, a set of four weights each mounted eccentrically on one of said shafts and located to reach its uppermost and lowermost positions simultaneously with the others of said weights.

4. A machine for vibratorily driving elongated members comprising, a traction vehicle having a power-take-off connection, a generally vertical arm pivotally connected at its lower portion to said vehicle, a generally vertical trackway spaced from said arm, a pair of generally parallel elongated bars vertically spaced apart pivotally connected at their opposite ends to said arm and said trackway, means for moving said arm about its pivotal connection to said vehicle to elevate said trackway, a carriage movable vertically along said trackway and having eccentric weight means for producing vibratory movement parallel to said trackway, clamp means on said carriage and aligned with said trackway for engaging a said elongated member, gear means on said carriage in driving engagement with said eccentric weight means, and transmission means interconnecting said power-take-off of said vehicle with said gear means, said transmission means including a drive rod extending from said power-take-off to said carriage in a direction generally parallel to said elongated bars.

5. A machine for vibratorily driving elongated members comprising, a traction vehicle having a power-take-off connection, a generally vertical arm pivotally connected at its lower portion to said vehicle, a generally vertical trackway spaced from said arm, a pair of generally parallel elongated bars pivotally connected at their opposite ends to said arm and said trackway, means for moving said arm about its pivotal connection to said vehicle to elevate said trackway, a carriage movable vertically along said trackway and having eccentric weight means for producing vibratory movement parallel to said trackway for engaging a said elongated member, gear means on said carriage in driving engagement with said eccentric weight means, and transmission means interconnecting said power-take-off of said vehicle with said gear means, said transmission means including a drive rod extending from said power-take-off to said carriage in a direction generall parallel to said elongated bars, said carriage including a frame movable along said track and a housing resiliently attached to said frame, said eccentric weight means being located on said housing.

6. A machine according to claim 5 wherein said eccentric weight means includes at least four parallel shafts each carrying a weight which is eccentric thereto, one half of said weights being located on one side of a vertical plane parallel to said shafts, all weights on one side of said vertical plane rotating in a same direction which is opposite to the direction of rotation of all weights located on another side of said vertical plane, said gear means imparting to all of said shafts a same speed and, said eccentric weights being in phase with each other so that all of said weights will reach their uppermost and lowermost positions simultaneously.

7. A machine according to claim 6 in which said housing contains a bath of lubricant which fills said housing to a liquid level above the lowermost position of at least one of said weights, lubricant passage means having an inlet above said liquid level and located to receive lubricant splashed upwardly by said weights and an outlet directly above said gear means; whereby the movement of said at least one of said weights will splash a lubricant into said passage and said lubricant will fall onto said gear means to provide lubrication thereto.

8. A vibrating assembly comprising, a housing having enclosed first, second and third chambers and adapted to contain a quantity of lubricant, a first shaft extending through all of said chambers; said first shaft having a pinion gear in said third chamber, a first spur gear in said second chamber, and a weight mounted eccentric thereto in said first chamber; a bull gear in said third chamber in driving connection with said pinion gear for imparting rotation to said first shaft; second, third and fourth shafts extending through said first and second chambers, each having a weight mounted eccentric thereto in said first chamber and a spur gear in said second chamber; said second shaft being horizontally displaced from said first shaft, said third shaft being vertically displaced from said first shaft, said fourth shaft being vertically displaced from said second shaft, first idler gear means interconnecting said first spur gear with the spur gear on said second shaft for rotation at the same velocity in opposite directions, second idler gear means interconnecting said first spur gear with the spur gear on said third shaft for rotation at the same velocity in a same direction, third idler gear means interconnecting the spur gear on said second shaft with the spur gear on said fourth shaft for rotation at the same velocity in a same direction, a passage between said first chamber and said second chamber, said passage having an inlet in said first chamber above said liquid level and located to receive lubricant splashed upwardly by said weights and an outlet in said second chamber disposed above the gears located therein; whereby the rotation of said shafts and weights will splash a lubricant into said passage and said lubricant will fall onto said gear means to provide lubrication thereto.

9. A vibrating assembly according to claim 8 having a frame, resilient means interconnecting said frame with said housing, and clamp means on said frame for attachment to an elongate member which is to be driven.

10. A vibrating assembly for driving elongated members comprising, a fixed power source, a vibrating carriage mounted for vertical movement, said carriage including a frame having clamp means for engaging an elongated member, a housing resiliently mounted on said frame; a vibration-inducing means on said housing and having eccentric weights, an input shaft and gear means connecting said input shaft to said eccentric weights; a transmission shaft aligned with said input shaft and journaled in said frame, a flexible connector means interconnecting said transmission shaft and said input shaft, and transmission means connecting said power source with said transmission shaft.

References Cited

UNITED STATES PATENTS

| | | | |
|---|---|---|---|
| 2,565,224 | 8/1951 | Gibbens | 173—22 X |
| 3,056,306 | 10/1962 | Muller | 74—61 |
| 3,190,369 | 6/1965 | Pyles | 173—49 X |
| 3,215,209 | 11/1965 | Desvaux | 173—49 |
| 3,280,924 | 10/1966 | Pavlovich | 173—49 X |
| 3,286,534 | 11/1966 | Truelock et al. | 74—61 X |
| 3,302,731 | 2/1967 | Perry | 173—132 X |

FRED C. MATTERN, JR., *Primary Examiner.*

L. P. KESSLER, *Assistant Examiner.*